(12) United States Patent
Song et al.

(10) Patent No.: US 9,652,580 B2
(45) Date of Patent: May 16, 2017

(54) INTEGRATED CIRCUIT LAYOUT DESIGN SYSTEM AND METHOD

(71) Applicants: Taejoong Song, Seongnam-si (KR); Jae-Ho Park, Suwon-si (KR); Sanghoon Baek, Seoul (KR); Giyoung Yang, Seoul (KR); Sang-Kyu Oh, Gwacheon-si (KR); Hyosig Won, Suwon-si (KR)

(72) Inventors: Taejoong Song, Seongnam-si (KR); Jae-Ho Park, Suwon-si (KR); Sanghoon Baek, Seoul (KR); Giyoung Yang, Seoul (KR); Sang-Kyu Oh, Gwacheon-si (KR); Hyosig Won, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 2 days.

(21) Appl. No.: 14/709,885

(22) Filed: May 12, 2015

(65) Prior Publication Data

US 2016/0026749 A1    Jan. 28, 2016

Related U.S. Application Data

(60) Provisional application No. 62/028,134, filed on Jul. 23, 2014.

(30) Foreign Application Priority Data

Oct. 2, 2014   (KR) .................. 10-2014-0133271

(51) Int. Cl.
*G06F 17/50* (2006.01)

(52) U.S. Cl.
CPC ...... *G06F 17/5081* (2013.01); *G06F 17/5072* (2013.01)

(58) Field of Classification Search
CPC ........... H01L 2224/8113; G03F 9/7084; G03F 9/7076; G03F 1/36; G03F 7/2063; G03F 7/70633; G03F 9/708; G06F 17/5068; G06F 17/5072; G06F 17/5081
USPC .......................... 716/118–119, 132–135, 139
See application file for complete search history.

(56) References Cited

U.S. PATENT DOCUMENTS

| | | |
|---|---|---|
| 6,662,350 B2 | 12/2003 | Fried et al. |
| 7,093,208 B2 | 8/2006 | Williams et al. |
| 7,194,704 B2 * | 3/2007 | Kotani ............... G06F 17/5081 257/E21.024 |

(Continued)

FOREIGN PATENT DOCUMENTS

| | | |
|---|---|---|
| JP | H06-052254 A | 2/1994 |
| KR | 10-2010-0022731 A | 3/2010 |

*Primary Examiner* — Nghia Doan
(74) *Attorney, Agent, or Firm* — Volentine & Whitt, PLLC

(57) ABSTRACT

A method of generating a photo mask for use during fabrication of a semiconductor device includes; generating an initial layout design including critical circuit paths and non-critical circuit paths by shielding all gate line patterns used to implement transistors in the critical circuits and non-critical circuits, and thereafter generating a layout design from the initial layout design by selectively un-shielding a non-critical gate line pattern among the gate line patterns used to implement a gate of a non-critical transistor in a non-critical circuit, while retaining the shielding of all critical gate line patterns among the gate line patterns.

19 Claims, 10 Drawing Sheets

(56) References Cited

U.S. PATENT DOCUMENTS

| | | |
|---|---|---|
| 7,571,408 B1 * | 8/2009 | Ylinen .............. G06F 17/5077 257/659 |
| 7,627,836 B2 | 12/2009 | Culp et al. |
| 7,716,612 B1 | 5/2010 | Gupta et al. |
| 7,730,432 B1 | 6/2010 | Gupta et al. |
| 8,056,020 B2 | 11/2011 | Yamada |
| 8,062,810 B2 | 11/2011 | Masanori |
| 8,490,043 B2 | 7/2013 | Gupta et al. |
| 8,555,233 B2 | 10/2013 | Chen et al. |
| 9,299,842 B2 * | 3/2016 | Baek ................ G06F 17/5063 |
| 2013/0254734 A1 | 9/2013 | Gupta et al. |

* cited by examiner

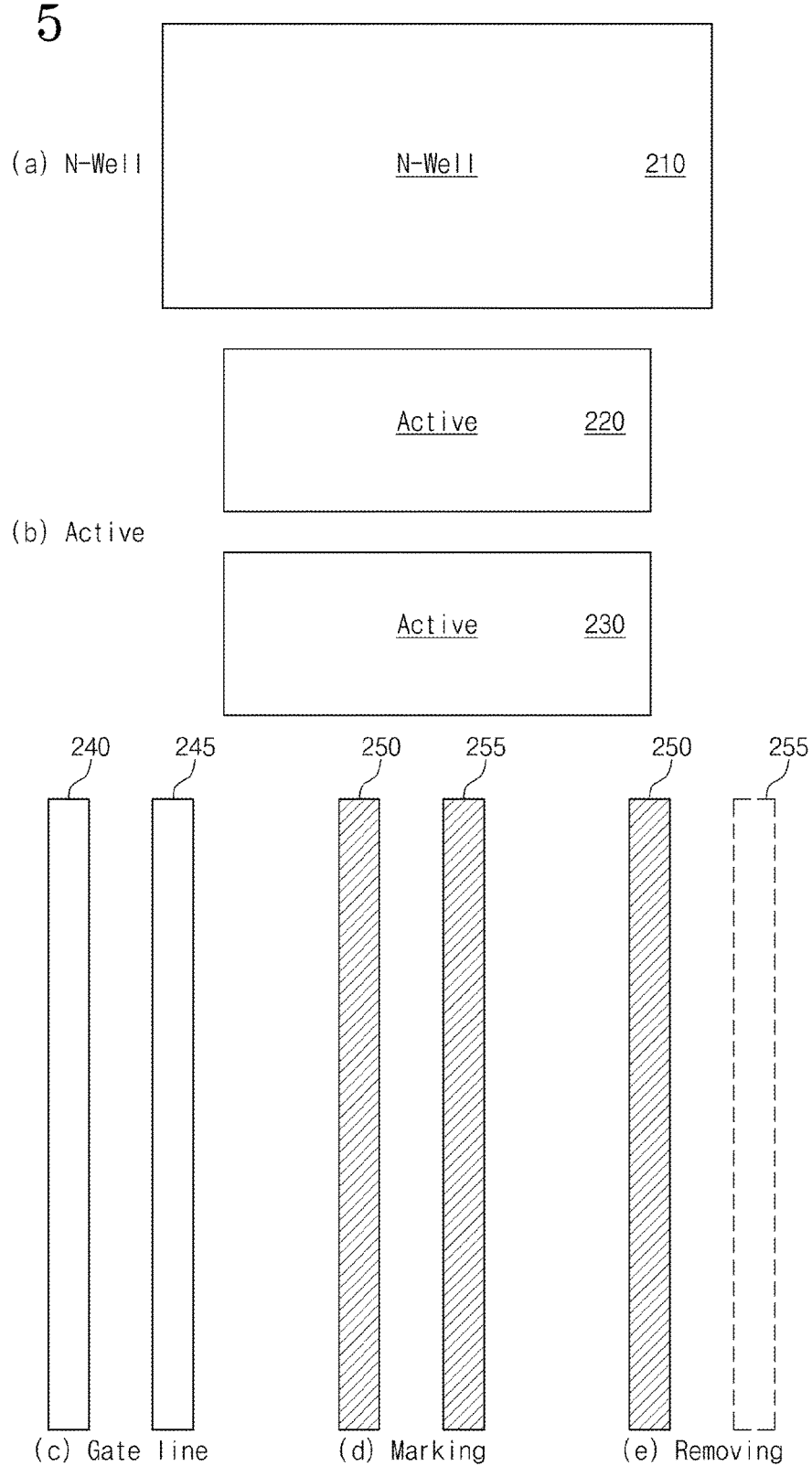

FIG. 8

| Gate Length (nm) | Speed | Leakage | Object |
|---|---|---|---|
| 14(L) | 1.1 | 1.4 | Critical (Speed is important) |
| 16(L+d) | 1 | 1 | non-Critical (Leakage reduction is important) |

US 9,652,580 B2

INTEGRATED CIRCUIT LAYOUT DESIGN SYSTEM AND METHOD

CROSS-REFERENCE TO RELATED APPLICATIONS

This U.S. non-provisional patent application claims priority under 35 U.S.C. §119 to U.S. Provisional Patent Application No. 62/028,134 filed on Jul. 23, 2014, and Korean Patent Application No. 10-2014-0133271 filed on Oct. 2, 2014, the subject matter of which is hereby incorporated by reference.

BACKGROUND OF THE INVENTION

Embodiments of the inventive concept relate generally to methods of designing semiconductor device layouts, as well as design systems used to design semiconductor device layouts. More particularly, embodiments of the inventive concept relate to optimizing methods for integrated circuits and related components.

Contemporary semiconductor devices are amazingly complex. A myriad of integrated circuits and related components must be carefully fabricated among multiple material layers. Many different processes must be used in relation to many different types of materials in order to ultimately fabricate a semiconductor device.

Given the great complexity of contemporary semiconductor devices, a considerable amount of design consideration and simulation must be carried out before a semiconductor device is ready for mass fabrication. The design and simulation of semiconductor devices is actually becoming more and more difficult as the minimum feature size(s) defining components and spacing between component continue to shrink. Furthermore, the shrinking of minimum feature size(s) has significant performance implications for certain components and circuitry.

Accordingly, the software and hardware tools (hereafter, collectively or individually "tools") used to design, simulate and/or optimize integrated circuits that will be included in a semiconductor device have become increasingly sophisticated. These tools usually receive a conceptual or high-level circuit design (hereafter, a "schematic circuit design") from a team of circuit designers. A schematic circuit design, wholly or in part, conceptually represents the components and component interconnections used to implement the functionality of a particular semiconductor integrated circuit. Ultimately, each component and component interconnection represented in a schematic circuit design will be physically fabricated from one or more patterned material layers including conductive material layers, semi-conductive material layers, insulating material layers, etc.

Accordingly, a schematic circuit design must be transformed into a semiconductor design layout. Instead of being conceptual in nature and directed to the ultimate functionality of a desired integrated circuit like the schematic circuit design, a "layout" defines the physical dimensions (e.g., vertical and horizontal) of material layers in the semiconductor device. Thus, the layout of the semiconductor device exactly defines during fabrication (e.g.,) the disposition, etching, patterning, masking and/or marking of the constituent material layers.

The various parts, and interrelationship between respective parts, of a layout are geometrically governed in their layout definition by a set of rules collectively or individually referred to as a "design rule." A design rule may be used to establish minimum component spacing, maximum feature sizes, minimum feature sizes, minimum pattern widths, minimum pattern separations, etc. The physical implementations controlled by a design rule have very real implication for the respective performance characteristics of components and circuits.

To meet the ever increasing demand for low-cost, high-density semiconductor devices, extremely fine patterning technologies are currently used to fabricate semiconductor devices. In certain instances, these fine-patterning technologies make it very difficult to functionally optimize the performance of various components and circuits included in a schematic circuit design when the schematic circuit design is transformed into a corresponding layout. Accordingly, improved layout design methods and design systems are required to fully realize the performance capabilities of contemporary semiconductor devices.

SUMMARY

Embodiments of the inventive concept provide a method generating a layout design for a semiconductor device, the method comprising; generating an initial layout design from a schematic circuit design including a first circuit having a first transistor with a first gate configured from a first gate line pattern and a second circuit having a second transistor with a second gate configured from a second gate pattern, wherein the first and second gate line patterns are designated with a shield mark in the initial layout design to prevent modification of the respective widths of the first and second gate line patterns, and optimizing the first circuit in view of a performance characteristic for the first transistor by removing the shield mark from the first gate line pattern during generation of the layout design.

Embodiments of the inventive concept provide a method generating a photo mask for use during fabrication of a semiconductor device, the method comprising; generating an initial layout design including critical circuit paths and non-critical circuit paths by shielding all gate line patterns used to implement transistors in the critical circuits and non-critical circuits, and thereafter generating a layout design from the initial layout design by selectively un-shielding a non-critical gate line pattern among the gate line patterns used to implement a gate of a non-critical transistor in a non-critical circuit, while retaining the shielding of all critical gate line patterns among the gate line patterns.

Embodiments of the inventive concept provide a method generating a photo mask configured for use during fabrication of a semiconductor device, the method comprising; defining respective widths of gate line patterns and shielding the gate line patterns in an initial layout design to prevent modification of the respective widths, selecting a transistor having a gate configured from a first gate line pattern among the gate line patterns for further optimization, determining a modification in the width of the first gate line pattern corresponding to the further optimization of the selected transistor, un-shielding the first gate line pattern during generation of a layout design from the initial layout design to enable the modification in the width of the first line pattern, and generating the photo mask from the layout design.

Embodiments of the inventive concept provide a method generating a photo mask used during fabrication of a semiconductor device, the method comprising; generating an initial layout design from a circuit design, identifying non-critical circuit paths in the circuit design, using a design rule for the initial layout design to define respective widths of gate line patterns and shielding the gate line patterns in the initial layout design to prevent modification of the respective widths of the gate line patterns, optimizing a transistor disposed in one of the non-critical circuit paths and having a gate configured from a first gate line pattern among the gate line patterns, determining a modification in the width of the first gate line pattern corresponding to the optimizing of the transistor, un-shielding the first gate line pattern during generation of a layout design from the initial layout design to enable the modification in the width of the first line pattern, and generating the photo mask from the layout design.

Embodiments of the inventive concept provide a method optimizing the performance of a circuit provided in a semiconductor device and including semiconductor transistors, the method comprising; optimizing a first performance characteristic of the circuit during generation of an initial layout design for the semiconductor device, wherein the initial layout design includes design information defining respective widths of gate line patterns used to implement the semiconductor transistors, and shield information that prevents modification of the respective widths of the gate line patterns, identifying a circuit path in the circuit including a first transistor among the semiconductor transistors and having a gate implemented using a first gate line pattern among the gate line patterns, optimizing a second performance characteristic of the circuit path to generate optimization information, using the initial layout design and the optimization information to generate a layout design for the semiconductor device, wherein shielding information for the first gate line patterns is modified to un-shield the first gate line pattern.

Embodiments of the inventive concept provide a method of designing a semiconductor device, comprising; shielding gate line patterns of an initial layout design for the semiconductor device from a change in width during generation of a photo mask used to fabricate the semiconductor device, selectively un-shielding a set of the gate line patterns during generation of a layout design derived from the initial layout design, and making a change in width for each one of the set of gate line patterns, wherein the change in width is either an increase in width or a decrease in width for each one of the set of gate line patterns.

BRIEF DESCRIPTION OF THE DRAWINGS

Certain embodiments of the inventive concept will be more clearly understood from the following brief description taken in conjunction with the accompanying drawings.

FIG. 5 is a diagram illustrating layouts for forming some patterns in the device of FIG. 4B and a layout method therefor.

FIG. 8 is a table listing variations in gate length achieved by the biasing method according to example embodiments of the inventive concept.

Figure 1:
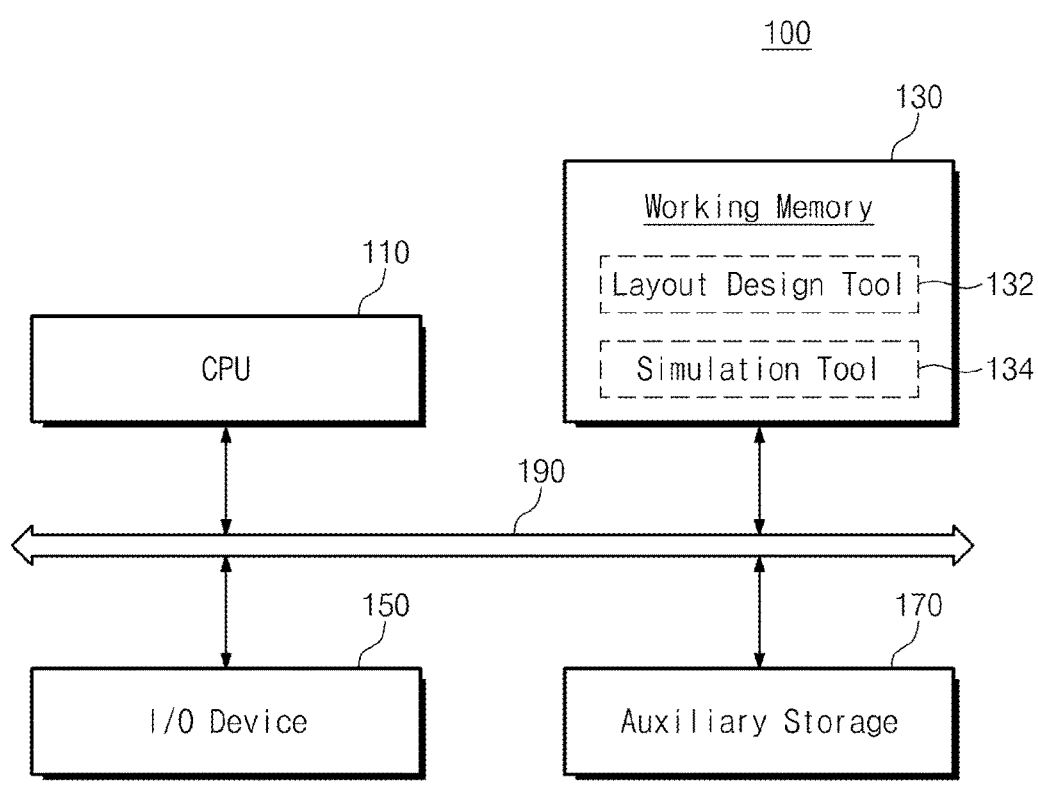
FIG. 1 is a block diagram illustrating a design system capable of performing designing a layout and generating a photo mask for a semiconductor device according to embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the concept of example embodiments to those of ordinary skill in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As has been noted above, the physical dimensions or geometry of material layers in a semiconductor layout directly determine the performance characteristics of the corresponding components and circuits defined by the schematic circuit design from which the layout is derived. For example, power consumption is an important performance characteristic for many integrated circuits, and power consumption for an integrated circuit is really just the aggregate of the power consumption for the individual components forming the integrated circuit. Recognizing that power consumption varies with operating mode, it is very important to minimize the power consumed during potentially lengthy inactive or stand-by modes.

A significant contributing factor to overall or stand-by power consumption for many integrated circuits is the leakage current associated with transistors in the integrated circuits. Thus, it is well recognized that transistor leakage current is an important design consideration for circuits in contemporary semiconductor devices. Further, it is well understood that gate leakage—a critical part of overall leakage current for a transistor—is linearly proportional to the physical length of the transistor's gate. (In this context the term transistor gate "length" is used to denote a physical distance across a semiconductor material separating the source and drain of the transistor in which the transistor channel is formed during operation.) Hence, as the length of a gate—as variously defined by relationships between material layers forming the transistor—increases, so too does both the leakage current and the active (or dynamic) current of the transistor. Further, the operating speed of a transistor is also influenced by the transistor gate length (i.e., lesser gate lengths tend to facilitate increased transistor operating speed). Accordingly, several performance trade-offs for transistors in semiconductor devices are directly related to transistor gate length(s). Not surprisingly, the width of patterned material layer(s) used to implement transistor gates are usually carefully controlled by a design rule.

From the foregoing it may be understood that specific transistor gate length modification (or "biasing") may be used to variously optimize the performance of selected transistors within one or more circuits of a semiconductor device. In fact, different design approaches using transistor gate length biasing for component and circuit optimization have previously been proposed. See, for example, U.S. Pat. No. 8,490,043, the subject matter of which is hereby incorporated by reference.

In this context, relatively small modifications (increases or decreases) to transistor gate length can have significant effects on overall device performance such as leakage current reduction since such modifications take advantage of so-called transistor short channel effects while incurring only small penalties in dynamic current capabilities and input capacitance. Further, transistor gate length modification approaches may readily be applied on a cell-by-cell basis or a transistor-by-transistor basis. As a result, transistor gate length optimization may be an integral part of an overall semiconductor design process and layout definition, whereby a designer may reference an existing library of standard cells to generate a schematic circuit design and thereafter selectively optimize cells and/or transistors of the schematic circuit design. Those skilled in the art understand that the definition of standard cells within one or more libraries of cells is a matter of design choice. Overly large libraries are expensive, potentially confusing, and often difficult to use, while small libraries limit design choices and may demand too much custom design work. In this regard, embodiments of the inventive concept allow efficient use of existing cell libraries during schematic circuit design generation, while also enabling further optimization of a corresponding layout. Thus, if the standard cells of an existing library are relatively optimized in terms of operating speed, for example, such standard cells may be used to generate a schematic circuit design and a corresponding "initial layout design". Thereafter, the initial layout design may be modified using one or more methods consistent with the inventive concept to "further optimize" one or more aspects of the initial layout design for power consumption, for example.

Thus, certain aspects of the inventive concept may be understood as contributing to a more general optimization process for a schematic circuit design and corresponding layout design. Typically, design optimization processes consistent with the inventive concept will be applied to an initial (or intermediate) layout design after definition of a schematic circuit design using one or more conventionally understood design approaches, such as those referencing one or more cell libraries. That is, a circuit designer may reference a set of standard cells in a library, where such standard cells have previously been optimized for inclusion within the library according to one or more performance characteristics. Thus, extending the example used above, "standard transistor gate lengths" for various transistors will be defined in a library for standard cells, and this information may be readily accessed by reference to the library. Thereafter, one or more of the standard transistor gate lengths may be modified using a method according to an embodiment of the inventive concept on a standard cell basis, an identified circuit basis, and/or an identified transistor basis.

As may be readily appreciated, design systems running sophisticated programs are commonly used to assist a designer in the various processes routinely used to generate an optimized layout. Layout generation from a schematic circuit design, as well as layout evaluation, modification and simulation may all be facilitated by the use of one or more software tools running on a design system.

For example, Figure (FIG.) 1 is a block diagram illustrating a general computer system 100 that has been programmed to perform a number of semiconductor design processes in relation to embodiments of the inventive concept. Referring to FIG. 1, the computer system 100 comprises a central processing unit (CPU) 110, a working memory 130, an input-output (I/O) device 150 and an auxiliary storage device 170 respectively connected via a system interconnection (or bus) 190. Here, it is assumed that a general computer, such as a commercially available personal computer (PC) or laptop, has been programmed with software (e.g., a layout design tool 132 and simulation tool 134) necessary to implement the functionality described hereafter in relation to certain exemplary embodiments of the inventive concept. However, more customized design systems might be used to perform the layout design and simulation processes according to embodiments of the inventive concept.

The working memory 130 may include one or more volatile memory devices (e.g., static random access memory (SRAM) or dynamic random access memory (DRAM) devices) or nonvolatile memory devices (e.g., PRAM, MRAM, ReRAM, FRAM or NOR FLASH memory devices).

As is customary, the CPU 110 of the design system 100 is configured to cooperatively "run" (or drive) a variety software including one or more operating systems, device drivers, and applications. In this regard, the operating system (not shown) as well as the various applications may be loaded in the working memory 130 for execution by the CPU 110, where the CPU 110 runs the various application using operating system resources. In the illustrated example of FIG. 1, both the layout design tool 132 and simulation tool 134 are assumed to be loaded in the working memory 130. However, the operating system and various layout design/simulation tools may initially be stored in the auxiliary storage device 170 before being loaded to the working memory 130 during a boot sequence for the design system 100. In this regard, the overall loading and unloading of applications to the working memory 130 may be managed by the operating system. Various applications may be selected by a user of the design system 100 and loaded to the working memory 130.

In certain embodiments of the inventive concept, the layout design tool 132 loaded to the working memory 130 of FIG. 1 is assumed to provide the functionality necessary to modify (or further optimize) of a layout design. For example, the layout design tool 132 may be used to selectively modify one or more transistor gate length(s) in order to change the operating characteristic(s) of one or more "selected transistors". Such modifications to standard transistor gate length(s) may move the resulting modified transistor gate length(s) outside the geometric boundaries associated with an applied design rule in order to further optimize one or more circuits implemented by the layout. Thus, in certain embodiments of the inventive concept, the layout design tool 132 may be configured to include functionality necessary to perform an iterative design rule check on various aspects of a modified layout.

Thus, assuming that the layout design tool 132 is configured to perform a transistor gate length biasing, during a transistor gate length biasing operation, a transistor gate length included in a selected region or a selected data path may be selectively adjusted according to a predetermined sequence of process steps in order to modify the physical geometry of a corresponding material layer in a given layout. Assuming that the material layers associated with an initial layout design are defined according to an applicable design rule, a modification method according to embodiments of the inventive concept may be used to optimize certain aspects of the geometry outside the design rule. For example, during a transistor gate length biasing operation according to the inventive concept, the layout design tool 132 may be selectively used to add or remove a "shield marker" to a gate line pattern used to define the length of a corresponding transistor gate in a layout design. Thereafter, the presence or absence of a shield marker in relation to the gate line pattern controls whether or not the geometry of the gate line pattern may be changed during further optimization steps directed to the initial layout design. For example, "shielded gate line patterns" (i.e., gate line patterns in a layout design having a corresponding shield marker) may not be modified during (e.g.,) power optimization processes applied to the gate line patterns of the layout, while "un-shielded gate line patterns" (i.e., gate line patterns in a layout design lacking a corresponding shield marker) may be modified. In this regard, certain circuit paths implemented by a layout, certain regions of a layout, certain cell type(s), and/or certain transistor type(s) may be designated as "shielded" verses "un-shielded" for purposes of further optimization.

In one approach provided by certain embodiments of the inventive concept, the layout design tool 132 may be used to initially and universally "mark" all gate line patterns of a layout or a layout region as being shielded. Thereafter, the shield marker(s) for certain gate line patterns may be selectively removed. This selective removal of shield markers may be governed by layout region, cell type, transistor type, and/or particular circuit path disposition for a transistor. Hence, extending the working assumptions above for this particular embodiment, all standard transistor gate lengths may be designated as shielded (or protected) for an initial layout design, since they comport with applicable design rules, as verified by evaluation and simulation of the initial layout design. Then, exceptional instances wherein certain transistors may be further optimized by departing from the corresponding standard transistor gate length may be identified. Accordingly, the shield markers or shield designations associated with the gate line patterns of the further optimized transistors are removed, allowing modification potentially outside the bounds of the design rule.

Regarding observations to or exceptions from an established design rule, the layout design tool 132 may be used to (iteratively) perform a design rule check on a layout as it is further optimized, such as during a transistor gate length biasing operation. As necessary, the simulation tool 134 may also be used, to perform optical proximity correction (OPC) for example, during various layout design optimization processes.

In FIG. 1, the I/O device 150 may be used to control user input and/or output operations in relation to one or more user interface devices, such as a keyboard, touch-screen, display monitor, etc. Using the I/O device 150, a designer may retrieve, examine, evaluate and/or modify layout design information for to an entire layout, one or more layout regions, or data paths implemented by the layout. For example, the I/O device 150 may be configured to display optimization status or the result of a simulation.

The system interconnector 190 serves as a system bus for the design system 100. The CPU 110, working memory 130, I/O device 150, and storage device 170 may be variously interconnected with each other via the system interconnector 190. Accordingly, the system interconnector 190 may have many different configurations sufficient to efficiently communicate data, control signals and/or commands between the various system components.

In the hands of a skilled layout designer, the design system 100 of FIG. 1 may be used to generate a schematic circuit design, generate an initial layout design from a given schematic circuit design, and/or generate a (final or optimized) layout design from the initial layout design by selectively optimizing one or more regions, circuit paths, cells and/or transistors. For example, according to certain embodiments of the inventive concept the design system 100 may be used modify the length of a transistor gate between an initial layout design and a final layout design. In order to selectively modify one or more gate line patterns provided in an initial layout design, corresponding shield markers must be removed (or omitted) during the optimization processes. Then, a transistor gate length may be effectively modified to further optimize the transistor's performance. As a result, it is possible to improve the overall layout design and its corresponding electrical performance while at the same time maintaining a well-controlled and efficient design approach.

Figure 2:
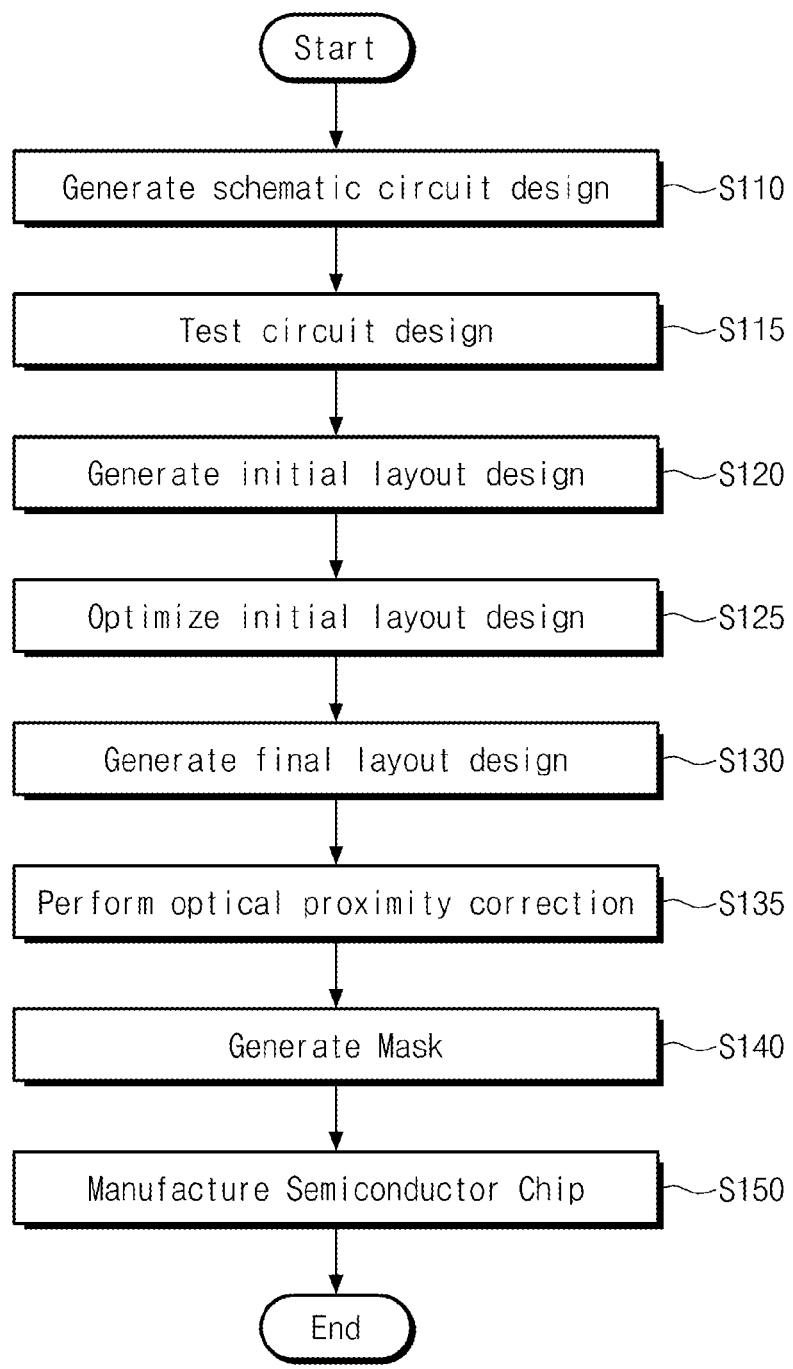
FIG. 2 is a flow chart summarizing a method of designing and fabricating semiconductor integrated circuits according to embodiments of the inventive concept.

FIG. 2 is a flow chart summarizing in one example a method of manufacturing a semiconductor chip according to an embodiment of the inventive concept. Referring to FIG. 2, the design and manufacture of a semiconductor chip begins with the high-level design definition of a schematic circuit design (S110). Many conventionally understood software tools and design packages may be used by a designer (or team of designers) to determine a desired schematic circuit design. Circuit design is usually an iterative process that involves testing (S115) and retesting of the circuit design to optimize one or more performance characteristic(s) or to optimize a set of design trade-offs between (e.g.,) power consumption, operating speed, circuit size, data throughput capabilities, etc. One or more cell libraries or circuit libraries may be referenced by the designer during the process of developing a schematic circuit design.

Once a final schematic circuit design has been developed and optimized (or improved) in relation to one or more performance characteristics, it may be used to generate an initial layout design (S120). As has been noted above, a layout design controls the physical geometric definitions of the material layers used to implement a semiconductor chip, unlike the schematic circuit design that is a conceptual representation of the components used to implement the functionality provided by the semiconductor chip.

For example, during the high-level design process various integrated circuit may be designed using software tools programmed in a high-level computer language, such as "C". Thereafter, the integrated circuit design provided by this high-level design process will be more definitively described using a register transfer level (RTL) coding, for example, Specialized software tools exist for converting a high-level integrated circuit design into corresponding RTL coding, where the RTL coding may be efficiently used to run various a simulations and/or evaluations on the schematic circuit design expressed by the RTL coding.

Further, as an example, the RTL coding may be piecewise converted into a data form referred as "netlist", and the results ultimately combined to fully describe the semiconductor integrated circuit. Throughout these conversion processes, the schematic circuit design may be evaluated, verified and/or adjusted using simulation/evaluation tools. The foregoing is just one possible approach and many different approaches are conventionally understood whereby a competent schematic circuit design is generated according to an established design rule and various operational parameters ultimately ascribed to the corresponding semiconductor chip.

However generated or expressed in a particular coding format, the schematic circuit diagram is used to generate the initial layout design (S120). That is, an initial layout design is generated that is fully capable of controlling the fabrication of the desired semiconductor chip. For example, the initial layout design may be generated directly from a high-level schematic circuit design or from a corresponding netlist. The initial layout design may include routing step(s) that facilitate the placement and connection of various cells obtained from a cell library in view of the applied design rule.

Once an initial layout design has been generated in this manner, one or more aspects of the initial layout design may be further optimized (S125), even where such selective further optimization might technically violate the design rule previously applied to generate the initial layout design. In this context, the term "further optimization" is used to distinguish the various optimization processes that may have been a constituent part of the schematic circuit generation and/or initial layout design generation. These earlier optimization processes are assumed to be constrained by the applied design rule, and may in many instances include reference to certain standard cells documented in a cell library. In contrast, further optimization of a transistor, a type of transistor, a cell, a type of cell, a circuit path, and/or a layout region may, but need not always, selectively move the geometric definition of the transistor, type of transistor, cell, type of cell, circuit path, and/or layout region outside the limits prescribed by the design rule.

As part of a general ability to further optimize one or more elements of an initial layout design, certain embodiments of the inventive concept may modify or bias the length of one or more transistor gates, already defined in the initial layout design. For example, one or more gate line patterns used to define the length of transistor gates may be selectively un-shielded during generation of a final layout design from a given initial layout design, where the final layout design may also include modification information defining how the un-shielded gate line pattern is to be physically altered from its previous geometric definition.

Thus, according to certain embodiments of the inventive concept, an initial layout design may include shield markers corresponding to all gate line patterns used to define the respective gates of all transistors included in the initial layout design. Thereafter, in view of one or more performance characteristic(s) to be further optimized on a transistor-by-transistor basis, a transistor type-by-transistor type basis, a cell-by-cell basis, a cell type-by-cell type basis, a circuit path-by-circuit path basis, and/or a layout region-by-layout region basis, one or more shield markers may be removed from implicated gate line patterns, thereby allowing their modification in the final layout design (S130). In this regard, many semiconductor chips may be more efficiently design and manufactured using an approach to final layout design that selectively removes shield markers, as opposed to approaches wherein modification markers are selectively added to component to be modified in an initial layout design.

As will be appreciated by those skilled in the art, cell libraries usually contain information regarding the operating characteristics, operating speed, and power consumption of many cells. Consistent with certain embodiments of the inventive concept, one or more cell libraries used to generate a schematic circuit design and/or an initial layout design may be referenced by the layout design tool 132 of FIG. 1. The referenced layout information provided in relation to the constituent cells of the library may be used to define or describe the physical geometry of material layers and patterned material layers that constitute transistors, logic gates and related elements and components, as formed on a semiconductor substrate, for example. For example, in order to physically form an inverter—one type of very common element used in integrated circuits—on a semiconductor substrate, it is necessary to prepare or generate a corresponding portion of a layout design that properly patterns multiple constituent parts (e.g., a P-type region, an N-type region, an N-well region, a gate line pattern). In order to efficiently facilitate the suitable design of an inverter having desired operating characteristics, a standard inverter cell may be selected from a cell library. Thereafter, one or more routing steps may be designated to properly connect the various parts (i.e., regions). These types of layout design steps may be automatically or manually performed using the layout design tool 132.

Once all relevant routing steps are designated, a verification step may be applied to determine (i.e., check) whether or not any part or parts connection associated with provision of the inverter in the initial layout design violates the design rule. There are many different verification approaches that may be sued in conjunction with embodiments of the inventive concept. For example, a verification step may include evaluating one or more aspects of a particular transistor cell or region using a design rule check (DRC), an electrical rule check (ERC), and/or a layout verses schematic (LVS) evaluation. And has been previously noted, verification steps may be readily incorporated into one or more of the foregoing method steps as part of an iterative design process.

Once a final layout design has been completed in view of all desired further optimizing considerations, an optical proximity correction (OPC) step may be performed (S135). The OPC step may be performed to evaluate and compensate for certain optical proximity effects that may arise in the conversion of a layout design into one or more physical masks used to control photolithography processes. Optical proximity effects may result from unintended optical interferences caused by refraction or diffraction during the exposure of a photo mask during photolithography processes. Thus, the OPC step may be used to modify the placement and/or geometry of certain material layers designated by a layout design in order to mitigate the optical proximity effects.

In this regard while the use of an OPC step is conventionally understood during the generation of a photo mask subsequently used to manufacture a semiconductor chip, certain embodiments of the inventive concept take advantage of the practical necessity of the OPC step to coincidently accomplish further optimization (e.g., gate line pattern biasing after generation of an initial layout design) of a layout design. In other words, since the OPC step must necessarily be capable of correcting (or modifying) material layers designated in a layout design, modifications to such material layers, including modifications related to further optimization of selected elements and/or circuits, may be made during the OPC stage of generating a photo mask, whether such modifications are specifically related optical proximity effects or further optimization of selected elements and/or circuit paths.

It should be noted that for the sake of descriptive clarity the preceding description uses the terms "initial layout design" and "final layout design" to describe different stages in the development of a layout design appropriate to the generation of one or more photo masks that will subsequently be used to fabricate a semiconductor device. Those skilled in art will recognize that such distinct layout design stages need not be specifically manifest in methods that fall within the scope of the inventive concept. Bearing in mind that much of the foregoing will be accomplished by the execution of corresponding software routines, such software routines may be variously combined in their execution to generate a layout design from a schematic circuit design, and thereafter to generate a photo mask from the layout design.

Once OPC has been performed on a final layout design, one or more photo mask(s) may be fabricated using the design information contained in the final layout design (S140). The manufacture and use of photo masks is well known in the semiconductor arts. There are many different types of photo masks that are manufactured using different techniques and related equipment. For example, one or more photo masks may be manufactured by patterning a chromium layer provided on a glass substrate based on information provided by the final layout design.

The one or more photo mask(s) manufactured using the final 1 layout design may subsequently be used to pattern various material layers during the fabrication of a semiconductor device (S150). That is, multiple fabrication steps necessary to the manufacture of a semiconductor device may be accomplished by exposing selected optical wavelengths through the one or more photo mask(s) onto a material layer or substrate.

The highly complex and variable semiconductor fabricating processes to which layout design methods according to the inventive concept may be applied have been only briefly described above as they are deemed to be generally understood. However, in the context of these processes one or more aspects of an initial layout design rendered from a schematic circuit design may be further optimized by selectively shielding (e.g., marking) or un-shielding (unmarking) various material layer patterns. For example, the selective shielding/un-shielding of gate line patterns may be used to further optimize the performance characteristics of corresponding transistors. Such an approach enables more effective generation of layout designs while preserving an ability to modify the performance of selected elements, components, cells and/or circuit paths.

Figure 3:
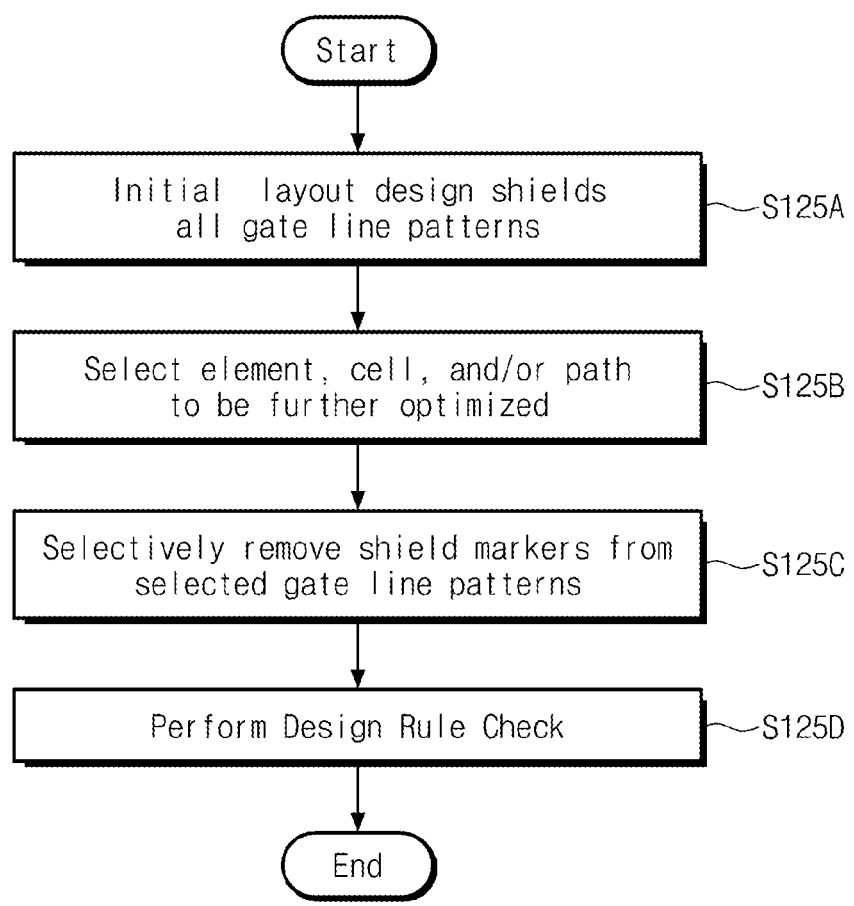
FIG. 3 is a flow chart further illustrating the layout design optimization of FIG. 2.

FIG. 3 is a flow chart summarizing in one example the step (S125) of further optimizing an initial layout design previously described in relation to the method of FIG. 2. In this regard, the example illustrated in FIG. 3 is drawn to a transistor gate biasing method, whereby one or more gate line patterns provided by an initial layout design are modified using an embodiment of the inventive concept.

Thus, all of the gate line patterns provided by an initial layout design are shielded using a designated shield marker or annotation (S125A). Then, a designer or an expert system-based design tool may select one or more elements, components, cells, regions and/or circuit paths for further optimization based on one or more design criteria (S125B). Once the elements, components, cells, regions and/or circuit paths for further optimization have been identified, corresponding material layer patterns, such as gate line patterns associated with transistor channel widths, may be selectively un-shielded by removing the corresponding shield markers or annotations from the initial layout design (S125C).

Thereafter, a design rule check may be performed (S125D). For example, a design rule check may be performed to evaluate (e.g.,) whether or not the width of a modified gate line pattern distance still falls within an allowable range defined by an applied design rule. In this manner, the final width of a gate line patterned may be iteratively modified to an optimal geometry in relation to one or more design constraints.

Here in one particular example, shielding markers may be provided for all transistors within an initial layout design. In other words, shield markers may be provided in similar manner for all gate line patterns respectively associated with all transistors to effectively define various transistor gate lengths. Assuming for one type of transistor a standard gate line pattern width of "L" corresponding to a gate length of L for the transistor type, an assigned shield marker or annotation will protect the gate line pattern width L during further processing of the initial layout design to generate a final layout design. However, if the selected transistor type requires further optimization by extending the width of the gate line pattern from L to (L+d), the shield marker or annotation may be removed from the initial layout design during generation of the final layout design. Thereafter, the un-shielded gate line patterns may be modified according to layout design modification information used to generate the final layout design. As has been previously described, the selective un-marking or re-annotating of a material layer pattern or region in an initial layout design may be performed upon selecting by a designer or design system a particular transistor, transistor type, cell, cell type, circuit path and/or layout portion.

Figure 4A:
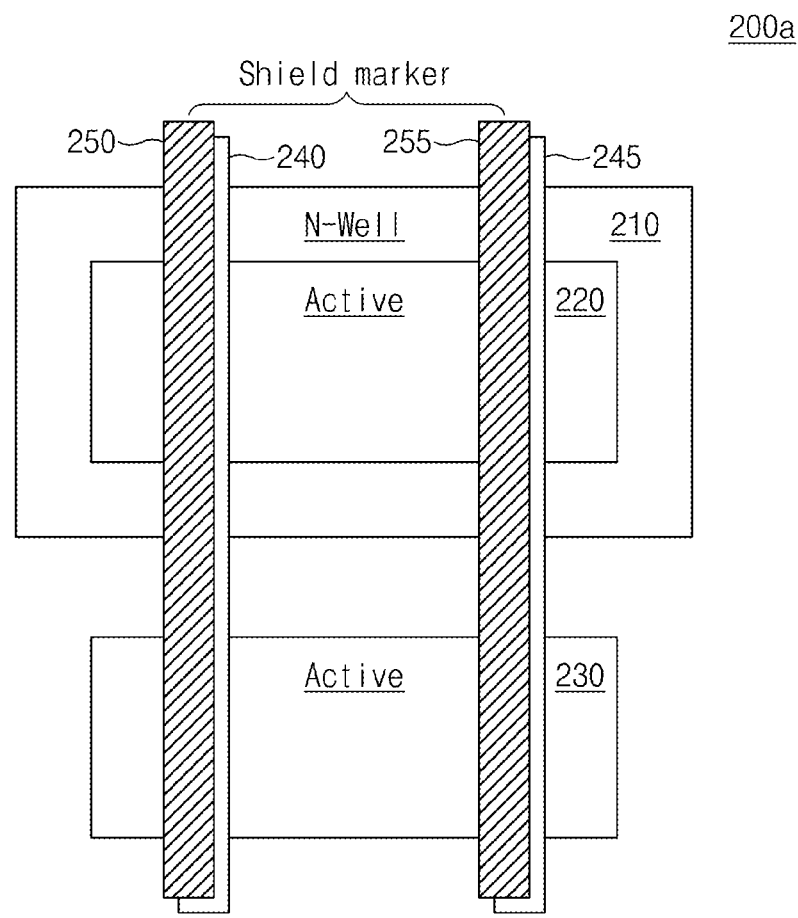
FIGS. 4A and 4B are a layout diagram illustrating a method of designing a layout of transistors according to embodiments of the inventive concept.
Figure 4B:
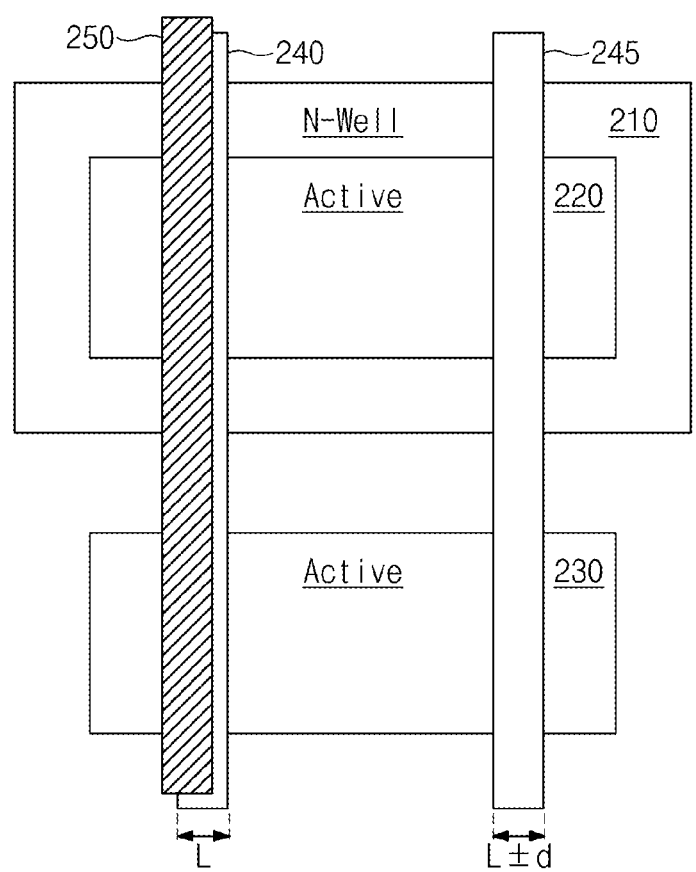
Figure 6:
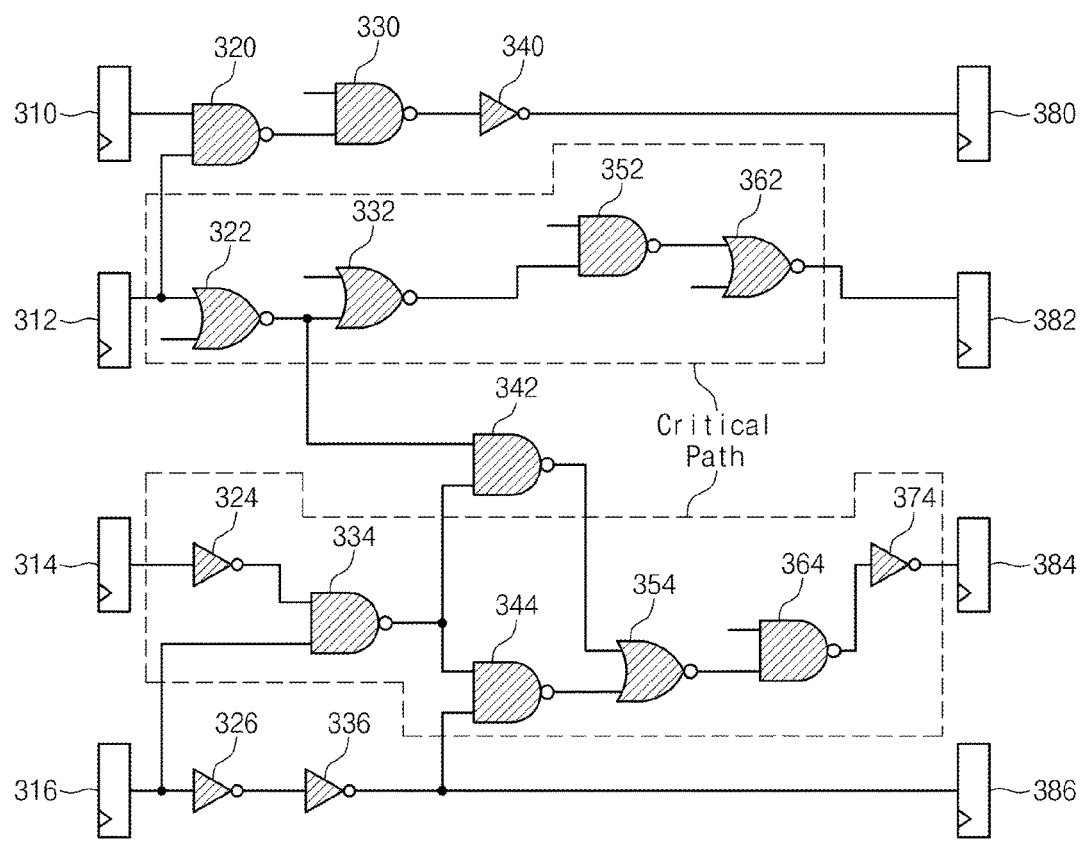
FIGS. 6 and 7 are gate-level circuit diagrams illustrating a biasing method according to example embodiments of the inventive concept.

FIGS. 4A and 4B are a layout diagram illustrating in on example a method of designing a layout of transistors according to an embodiment of the inventive concept. That is, FIGS. 4A and 4B shows certain transistor layouts before and after a biasing process conducted as part of further optimizing an initial layout design.

FIG. 4A shows a basic layout structure 200a for forming transistors. In the illustrated embodiment, the transistors may P-type or N-type Metal Oxide Semiconductor (PMOS or NMOS) transistors fabricated on a substrate. That is, the PMOS and NMOS transistors are assumed to include a polysilicon layer formed on the substrate. Under this assumption, an N-well 210 is formed in an upper portion of the substrate, and active regions 220 and 230 are respectively defined within and without the N-well 210. Gate line patterns 240 and 245 are formed of a polysilicon layer on the substrate. Shield markers 250 and 255 are provided in relation to the gate line patterns 240 and 245. Here, the shield markers 250 and 255 may be implemented using one or more data types defined by the layout design tool 132 of FIG. 1, for example. Accordingly, although the shield markers are conceptually illustrated in FIG. 4 in relation to respective gate line patterns in order to clearly described the illustrated embodiment of the inventive concept, the shield marker do not exist as distinct layout patterns, but exist as data entries to a layout design for each of the gate line patterns.

FIG. 4B shows a layout structure 200b obtained following application of a transistor gate biasing method according to an embodiment of the inventive concept. Referring to FIG. 4B, the transistor gate biasing method may be performed to maintain shield markers (e.g.,) for transistors desired to have a relatively high operating speed, while other shield markers are removed (e.g.,) for transistors desired to have a relatively low leakage current. Thus, in FIG. 4B, the biasing method maintains the shield marker 250 for the gate line pattern 240, and as a result during generation of a final layout design, gate line pattern 240 will retain with a width L, and the photo mask subsequently derived from the final layout design will include a gate line pattern portion having a width L. In contrast, the biasing method removes the shield marker 255 for the gate line pattern 245. As a result, a fabrication process (e.g., a photo mask patterning process) used to manufacture the photo mask may modify the width of a polysilicon layer corresponding to the gate line pattern 245 to be (L+d) or (L−d).

FIGS. 5A, 5B, 5C, 5D and 5E are a diagram illustrating the formation and potential modification of various layout design elements arranged in combination to form the layout design shown in FIGS. 4A and 4B.

In FIG. 5A, the N-well pattern 210 is form for use as an N-well. The N-well may be formed in the upper portion of a substrate and may be used to realize the PMOS transistors.

In FIG. 5B, the active patterns 220 and 230 are formed. The active pattern 220 will be used to form the PMOS transistor in conjunction with the N-well pattern 210, and the active pattern 230 will be used to form the NMOS transistor in conjunction with the substrate.

In FIG. 5C, the gate line patterns 240 and 245 are formed. As initially formed the gate lines pattern 240 and 245 may lack the corresponding shield markers.

In FIG. 5D, the shield markers 250 and 255 are provided with respect to the gate line patterns 240 and 245. Here, the shield markers 250 and 255 may comprise marking information associated with (or "tagged" to) the gate line patterns 240 and 245.

Then, in FIG. 5E, the shield marker associated with a gate line pattern for a transistor selected to be further optimized is removed in order to realize specific operating characteristics for certain transistors.

The execution of the exemplary steps illustrated in FIGS. 5A through 5E may be controlled by certain data processing procedure(s) performed by the layout design tool 132 of FIG. 1. For example, the layout design tool 132 may be used to provide the shield markers for all transistors, and then selectively remove some of the shield markers for transistors, cells or regions identified for modification. This approach enables the realization of a semiconductor integrated circuit having desired operating characteristics while also making use of efficient circuit and layout design tools.

FIGS. 7A and 7B are gate-level circuit diagrams illustrating another method of designing a layout according to an embodiment of the inventive concept. In FIG. 7A, shield markers are provided for all of the transistors forming the logic gates (or logic gate cells) of the illustrated circuit, whereas in FIG. 7B certain shield markers have been removed.

Referring to FIG. 7A, logic gates used to for a signal path communicating data from first flip-flops 310, 312, 314, and 316 to second flip-flops 380, 382, 384, and 386 will be considered. In the illustrated configuration, the logic gates form a number of circuit (or data) paths. The various logic gates may have been selected by type and/or connectivity from a cell library for inclusion in the circuitry of FIG. 7A. As will be appreciated from the foregoing, this circuitry will ultimately be used to generate an initial layout design.

However, a layout designer may at this point decide to further optimize certain aspects of the initial layout design. For example, assuming that the overall schematic circuit design underlying the initial layout design has been optimized for maximum speed in signal propagation, it is readily discernible that some circuit paths are "critical" to the maximum throughput of data signals while other circuit paths are "non-critical" in this regard. Here, the terms critical and non-critical are relative terms drawn to one or more design criteria or benchmark.

Accordingly, constituent elements of critical circuit paths are deemed critical, while constituent elements of non-critical circuit paths are deemed non-critical. Hence, all critical elements (e.g., transistors) should not be modified from their specification in the initial layout design because doing so will effect signal propagation through a critical circuit path. In contrast, it may very well be possible to modified the specification of non-critical elements in the initial layout design because some signal timing margin may be available through the corresponding critical circuit path(s).

Assuming that all transistors (both critical and non-critical) have been shield marked as part of generating the initial layout design, certain transistors associated with non-critical logic gates (e.g., logic gates 320, 330, 340, 342, 326 and 336) may be un-marked to allow modification associated with further optimization. In contrast, the transistors associated with critical logic gates (e.g., 322, 332, 352, 362, 324, 334, 344, 354, 364 and 374) should remain shield marked to preserve the required (high-speed) timing capabilities of the critical circuit paths.

Thus, during the further optimization of the initial layout design to generate a final layout design, certain shield markers may be removed from gate line patterns for certain transistors constituting the non-critical logic gates.

Figure 7:
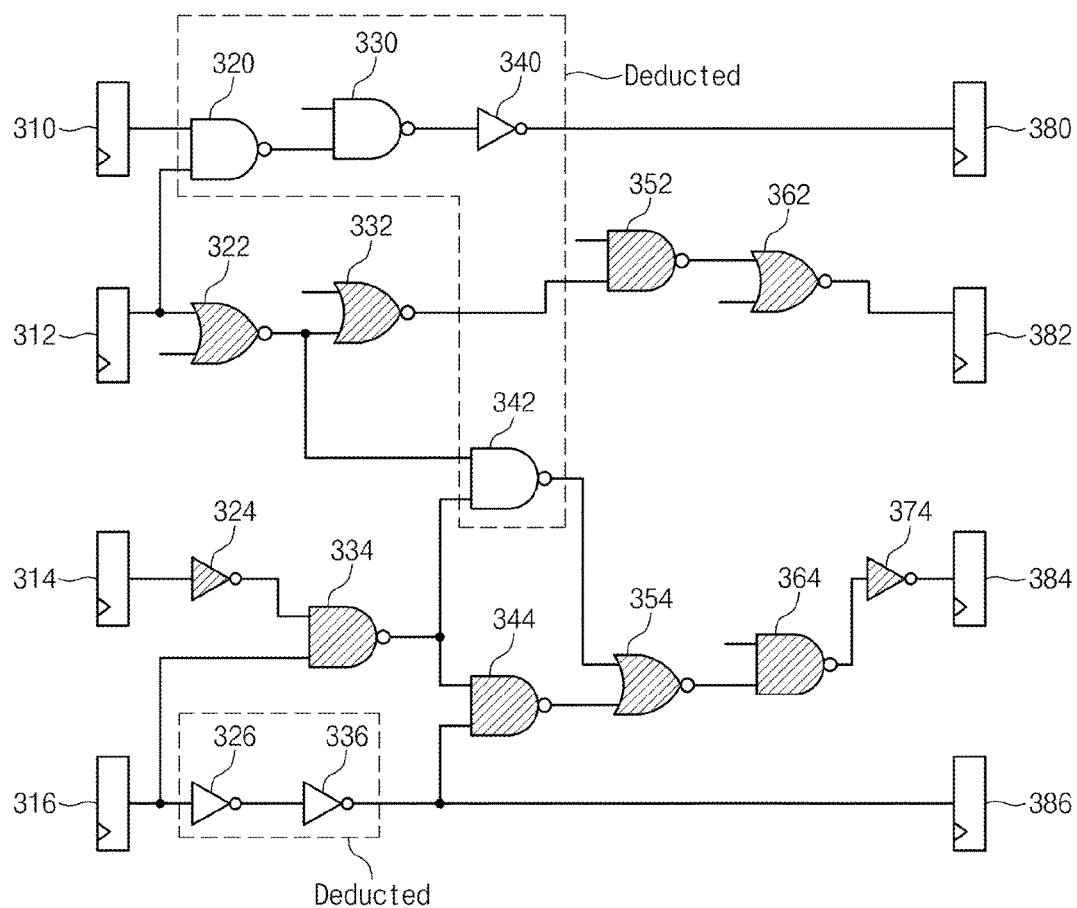

FIG. 7B shows the circuit of FIG. 7 after selected shield markers (shown in cross-hatch) have been removed. Here, the shield shield markers for elements constituting the relatively high-speed circuit paths are maintained, whereas the shield markers for the relatively low-speed circuit paths are removed. This allows further optimization (e.g., for reduced current consumption) of the transistors constituting the logic gates 320, 330, 340, 342, 326, and 336.

In general, during processes generating a layout design for a semiconductor device, the biasing process for reducing gate length will usually be more frequently performed, as compared with the maintaining of gate length. Thus, the afore-described method may provide a technical advantage in the generation of layout designs where the ratio of critical data paths (or critical transistors) having a high-speed or high-performance property is relatively high. For such layout designs, certain embodiments of the inventive concept may be applied with good effect and with high efficiency.

FIG. 8 is a table listing variations in gate length achieved by certain biasing methods according to embodiments of the inventive concept. In detail, FIG. 8 shows operating characteristics for two transistors, with and without the shield marker. The transistor without the shield marker is assumed to have a desired gate length of (L+d, or 16 nm), while transistors with a shield shield marker is assumed to have a desired gate length of (L or 14 nm, where d=2 nm). In the table, operating speeds and leakage currents are expressed in terms of relative values with respect to values of the transistor without the shield marker.

The transistor with the relatively shorter gate length has an operating speed increased to about 1.1 times and a leakage current increased to about 1.4 times, compared with the transistor with the gate length L. In the layout design process, the transistor with the shield marker may be selected from transistors, a cell library region, or a data path required for a high speed operation.

Figure 9A:
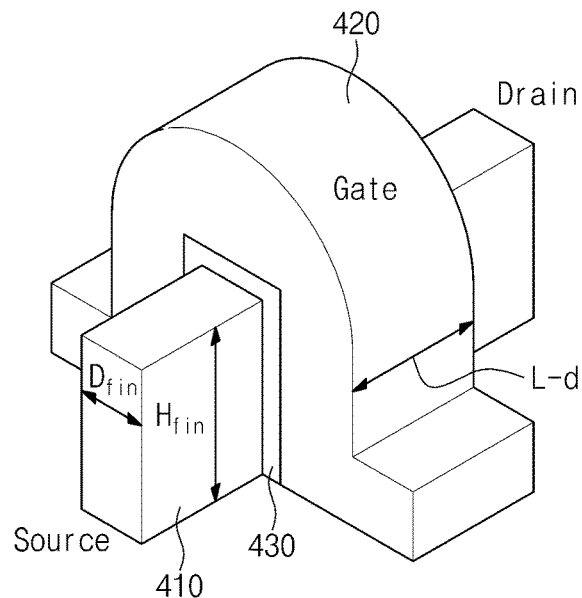
FIGS. 9A and 9B are a perspective view illustrating FinFETs, which are formed by the biasing method to have different gate lengths.
Figure 9B:
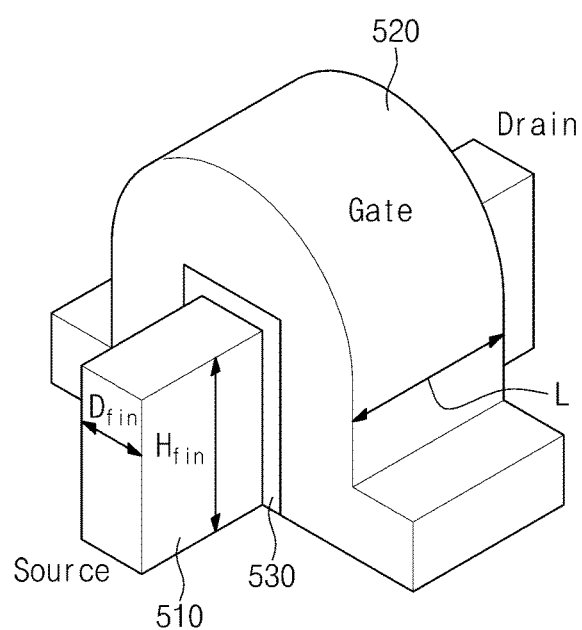

FIGS. 9A and 9B are a perspective view illustrating in one example a fin-shaped Field Effect Transistor (or "FinFET") that may be subjected to a gate length biasing method consistent with certain embodiments of the inventive concept.

In FIG. 9A, a bulk-type FinFET 400 is illustrated to further highlight certain technical outcomes that may arise in relation to embodiments of the inventive concept. A silicon fin 410 and an oxide region 430 is provided on a substrate (not shown). A gate 420 may be formed on the oxide region 430 and the silicon fin 410. Source and drain regions may be formed in the silicon fin 410. In example embodiments, a plurality of silicon fins 410 may be regularly arranged on the substrate and a device isolation region (not shown) (e.g., a trench or a shallow-trench isolation (STI)) may be provided between the plurality of silicon fins 410. The silicon fins 410 may be electrically separated from each other by the device isolation region. The silicon fin 410 has a height $H_{fin}$ and a width $D_{fin}$, which are controlled by a design rule applied during the layout design process.

The silicon fin 410 may be formed by etching a portion of the substrate and may be a protruding structure with both sidewalls and a top surface. Although not shown, the etched region of the substrate may be shaped like a trench and may be filled with a device isolation layer. The gate 420 may be provided to cross the silicon fin 410. In the layout design process, the gate structure of the FinFET may not be distinguished from that of a planar MOS transistor. Nevertheless, there may be a difference in active-region-forming processes between the FinFET and the planar transistor.

In the case where the shield marker is maintained, the gate 420 may be formed to have a gate length L. (In FIG. 9A, the gate length is L instead of L−d)

Referring to FIG. 9B, a FinFET 500 may include a silicon fin 510 and an oxide region 530. A gate 520 may be formed on the oxide region 530 and the silicon fin 510. The silicon fin 510 may include source and drain regions which are spaced apart from each other a channel region. The silicon fin 510 may have a height $H_{fin}$ and a width $D_{fin}$, which are defined by the design rule in the layout design process. In the case where the shield markers is removed or deducted, the gate 520 may be formed to have the gate length as L+d (In FIG. 9B, the gate length is L+d instead of L).

FIGS. 9A and 9B shows that a transistor gate length biasing step may be be used to finely adjust the gate length. For example, in the case where a shield marker is removed, the gate line pattern may be formed with an increased width. This means that the transistor will have an increased gate length. For high-performance semiconductor integrated circuits, the number of circuits that will need to maintain shield markers may very well be greater than the number of circuits that will need to remove shield markers. Accordingly, during a process of designing a layout for a semiconductor integrated circuit, the afore-described method of providing the shield markers for all transistors and selectively removing some may be more effectively performed, as compared with the conventional methods of selectively add modification markers to selected circuits.

Heretofore, certain embodiments of the inventive concept have been described wherein all elements (e.g., transistors) are marked with a shield marker in an initial payout design, and then shield markers are subsequently removed to allow further optimization of selected elements. However, this need not always be the case. For example, there are certain embodiments of the inventive concept where instead of applying and removing shield markers, modification markers are used. That is, all element (e.g., transistors) are left unmarked in an initial layout design, and then elements selected for modification are marked with a "modification marker" or annotation that allows further optimization of the selected elements. However, such is the case only where all selected elements (designated by a modification marker) are modified in the same direction. That is, one or more geometries defining a material layer of each selected element must either be increased in relative size or decreased in relative size.

Thus, assuming an array of 20 nm transistors and a desire on the part of designer to further optimize only two (2) of the transistors (e.g., T1 and T2), both T1 and T2 may be marked with a modification marker in an initial layout design. Thereafter, in view of the two corresponding modification markers, both transistors T1 and T2 may be either increased in size (e.g., to 28 nm transistors) or reduced in size (e.g., to 14 nm transistors). However, it is not possible to increase the size of T1 while decreasing the size of T2 or vice verses.

In the context of the specific working example used throughout gate line patterns for transistors marked with a modification marker may either be increased in width or decreased in width, but not both increased and decreased.

According to various embodiments of the inventive concept, a layout design method and related design system have been described. In one application, a gate line pattern biasing method capable of further optimizing a gate length of a transistor for a corresponding transistor may be used during final layout design generation. This makes it possible to reduce the cost and time required to design and check the final layout.

While example embodiments of the inventive concepts have been particularly shown and described, it will be understood by one of ordinary skill in the art that variations in form and detail may be made therein without departing from the scope of the attached claims.

What is claimed is:

1. A method generating a layout design for a semiconductor device, the method comprising:
generating an initial layout design from a schematic circuit design including a first circuit having a first transistor with a first gate configured from a first gate line pattern and a second circuit having a second transistor with a second gate configured from a second gate line pattern, wherein each of the first and second gate line patterns are designated with a mark in the initial layout design to indicate that the respective widths of the first and second gate line patterns cannot be modified within the initial layout design;
optimizing the first circuit in view of a performance characteristic for the first transistor and removing the designation mark for the first gate line pattern during generation of a final layout design;
generating the final layout design from the initial layout design, wherein the final layout design includes: (a) the designation mark for the second gate line pattern indicating that the width of the second gate line pattern cannot be modified within the final layout design and (b) the absence of the designation mark for the first gate line pattern, indicating that the width of the first gate line pattern can be modified within the final layout design; and
manufacturing the semiconductor device using the final layout design.

2. The method of claim 1, wherein the first circuit affects the maximum throughput of data signals within the semiconductor device and the second circuit does not affect the maximum throughput of the data signals within the semiconductor device.

3. The method of claim 1, wherein:
the schematic circuit design further includes a third circuit having a third transistor with a third gate configured from a third gate line pattern,
the third gate line pattern is designated with another mark in the initial layout design to indicate that the width of the third gate line pattern cannot be modified within the initial layout design, and
the method further comprises optimizing the third circuit in view of a performance characteristic for the third transistor and removing the other mark from the third gate line pattern during generation of the final layout design.

4. The method of claim 3, further comprising either increasing respective widths of the first and third gate line patterns, or decreasing the respective widths of the first and third gate line patterns.

5. The method of claim 4, wherein at least one of the first transistor, second transistor and third transistor is a fin-shaped field effect transistor.

6. A method generating a photo mask for use during fabrication of a semiconductor device, the method comprising:
generating an initial layout design, wherein the initial layout design includes information indicating that all gate line patterns used to implement transistors in critical circuits and non-critical circuits cannot be modified within the initial layout design; and thereafter,
generating a final layout design from the initial layout design, wherein the final layout design includes information indicating that all gate line patterns used to implement the transistors of the critical circuits cannot be modified within the final layout design and information indicating that a gate line pattern used to implement a gate of a transistor of one of the non-critical circuits can be modified within the final layout design; and
manufacturing the semiconductor device using the final layout design, wherein:
the critical circuits affect the maximum throughput of data signals within the semiconductor device, and
the non-critical circuits do not affect the maximum throughput of the data signals within the semiconductor device.

7. The method of claim 6, further comprising changing a width of the gate line pattern used to implement the gate of the transistor of the one non-critical circuit, while retaining respective widths of all gate line patterns used to implement transistors in the critical circuits.

8. The method of claim 7, wherein the changing of the width of the gate line pattern used to implement the gate of the transistor of the one non-critical circuit is performed during optical proximity correction of the final layout design.

9. The method of claim 7, wherein the changing of the width of the gate line pattern used to implement the gate of the transistor of the one non-critical circuit enables leakage current optimization within the final layout design.

10. The method of claim 6, further comprising:
modifying a width of the gate line pattern used to implement the gate of the transistor of the one non-critical circuit in the final layout design; and thereafter
checking a design rule for the width of the gate line pattern used to implement the gate of the transistor of the one non-critical circuit in the final layout design.

11. The method of claim 10, further comprising generating the photo mask from the final layout design.

12. The method of claim 11, wherein the modifying of the width of the gate line pattern used to implement the gate of the transistor of the one non-critical circuit in the final layout design and the checking of the design rule for the width of the gate line pattern used to implement the gate of the transistor of the one non-critical circuit in the final layout design are performed with an optical proximity correction of the final layout design.

13. The method of claim 6, wherein the initial layout design defines respective geometries for gate line patterns indicated on the photo mask.

14. A method optimizing the performance of a circuit provided in a semiconductor device and including semiconductor transistors, the method comprising:
optimizing a first performance characteristic of the circuit during generation of an initial layout design for the semiconductor device, wherein the initial layout design includes design information defining respective widths of gate line patterns used to implement the semiconductor transistors, and non-modification information that prevents modification of the respective widths of the gate line patterns;

identifying a circuit path in the circuit including a first transistor among the semiconductor transistors and having a gate implemented using a first gate line pattern among the gate line patterns;

optimizing a second performance characteristic of the circuit path to generate optimization information;

using the initial layout design and the optimization information to generate a final layout design for the semiconductor device, wherein the non-modification information is modified to permit modification of the width of the first gate line pattern; and manufacturing the semiconductor device using the final layout design.

15. The method of claim 14, wherein the first performance characteristic of the circuit is one of physical size, operating speed and fabrication cost, and the second performance characteristic of the circuit path is leakage current.

16. The method of claim 14, wherein the circuit path does not affect the maximum throughput of data signals within the semiconductor device.

17. The method of claim 14, wherein generating the initial layout design comprises performing a design rule check for the initial layout design, and generating the final layout design comprises performing a design rule check for the final layout design.

18. The method of claim 17, where the design rule for the initial layout design and the design rule for the final layout design are the same.

19. The method of claim 14, further comprising performing an optical proximity correction on the final layout design during which a first width of the first gate line pattern as defined by a design rule for the initial layout design is changed to a second width of the first gate line pattern in response to the optimization information, provided however that the first gate line pattern is modified in the final layout design.

* * * * *